(12) United States Patent
Asakura et al.

(10) Patent No.: US 10,717,461 B2
(45) Date of Patent: Jul. 21, 2020

(54) STEERING APPARATUS

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Masayoshi Asakura, Okazaki (JP); Tatsuhiro Yamamoto, Okazaki (JP); Masafumi Takahashi, Toyota (JP); Yoshiaki Asahara, Nagoya (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 15/822,821

(22) Filed: Nov. 27, 2017

(65) Prior Publication Data

US 2018/0162439 A1 Jun. 14, 2018

(30) Foreign Application Priority Data

Dec. 8, 2016 (JP) ................................ 2016-238091

(51) Int. Cl.
*B62D 5/04* (2006.01)
*F16H 57/027* (2012.01)
(Continued)

(52) U.S. Cl.
CPC ............ *B62D 5/0424* (2013.01); *B62D 3/08* (2013.01); *B62D 5/0448* (2013.01); *B62D 5/0472* (2013.01)

(58) Field of Classification Search
CPC .... B62D 7/163; B62D 5/0424; B62D 5/0472; B62D 5/0448; B62D 3/12; B62D 3/126;
(Continued)

(56) References Cited

U.S. PATENT DOCUMENTS 3,505,898 A * 4/1970 Bradshaw ................ B62D 3/12
74/498
3,554,048 A * 1/1971 Adams .................... B62D 3/123
74/498
(Continued)

FOREIGN PATENT DOCUMENTS

DE 27 34 516 A1 2/1979
JP 2002-037097 A 2/2002
(Continued)

OTHER PUBLICATIONS

May 7, 2018 Search Report issued in European Patent Application No. 17204650.0.
(Continued)

*Primary Examiner* — Anne Marie M Boehler
(74) *Attorney, Agent, or Firm* — Oliff PLC

(57) ABSTRACT

A steering apparatus includes a steered shaft; a rack housing; a ball screw nut; a bearing disposed between an inner peripheral surface of the rack housing and an outer peripheral surface of the ball screw nut, the bearing supporting the ball screw nut such that the ball screw nut is rotatable with respect to the rack housing; and a tubular rack boot covering an axial end portion of the rack housing. The rack housing includes a partition wall protruding radially inward from a cylindrical inner peripheral surface of the rack housing and separating a ball screw chamber housing the ball screw nut and an inner chamber of the rack boot. The partition wall has a through-hole through which the steered shaft extends, and a drain passage provided vertically below the through-hole and providing communication between the ball screw chamber and the inner chamber of the rack boot.

6 Claims, 4 Drawing Sheets

(51) Int. Cl.
*F16J 3/04* (2006.01)
*B62D 3/08* (2006.01)

(58) Field of Classification Search
CPC ...... B62D 3/06; B62D 5/0403; B62D 5/0445; F16J 3/04; F16J 3/046; F16J 3/048; F16H 57/027
USPC .............................. 180/444; 74/388 PS, 467
See application file for complete search history.

(56) References Cited

U.S. PATENT DOCUMENTS

| | | | | |
|---|---|---|---|---|
| 5,216,928 | A * | 6/1993 | Kodachi | B62D 3/12 384/296 |
| 6,026,924 | A * | 2/2000 | Godek | B62D 3/12 180/444 |
| 7,665,747 | B2 * | 2/2010 | Arlt | F16C 33/20 280/93.514 |
| 7,784,804 | B2 * | 8/2010 | Span | B62D 3/12 180/427 |
| 8,931,268 | B1 * | 1/2015 | Langenfeld | F16D 31/02 60/485 |
| 2003/0019686 | A1 | 1/2003 | Fukuda et al. | |
| 2005/0184480 | A1 * | 8/2005 | Arlt | B62D 3/12 280/89.12 |
| 2006/0076180 | A1 * | 4/2006 | Saito | B62D 3/12 180/428 |
| 2007/0227804 | A1 | 10/2007 | Fukuda et al. | |
| 2014/0291062 | A1 | 10/2014 | Tojo | |
| 2015/0151787 | A1 * | 6/2015 | Ohashi | B62D 7/163 280/93.511 |
| 2015/0274194 | A1 * | 10/2015 | Kimijima | B62D 3/126 280/777 |
| 2015/0284019 | A1 * | 10/2015 | Yamamoto | F16K 15/144 180/443 |

FOREIGN PATENT DOCUMENTS

| | | |
|---|---|---|
| JP | 2010-007769 A | 1/2010 |
| JP | 2014-189060 A | 10/2014 |
| JP | 2016-097840 A | 5/2016 |

OTHER PUBLICATIONS

Apr. 7, 2020 Office Action issued in Japanese Patent Application No. 2016-238091.

* cited by examiner

STEERING APPARATUS

INCORPORATION BY REFERENCE

The disclosure of Japanese Patent Application No. 2016-238091 filed on Dec. 8, 2016 including the specification, drawings and abstract is incorporated herein by reference in its entirety.

BACKGROUND

1. Technical Field

The disclosure relates to a steering apparatus.

2. Description of Related Art

Conventionally, there is known a steering apparatus that turns steered wheels of a vehicle (see, e.g., Japanese Patent Application Publication No. 2014-189060 (JP 2014-189060 A)). This steering apparatus includes a steered shaft, a rack housing, a ball screw nut, and a bearing. The steered shaft is a shaft configured to turn the steered wheels and is a shaft member extending in a vehicle width direction and movable in an axial direction. The rack housing is formed in a cylindrical shape and holds the steered shaft such that the steered shaft is movable in the axial direction.

The ball screw nut is a cylindrical member disposed coaxially with the steered shaft and has an outside diameter greater than that of the steered shaft. The ball screw nut is threadedly engaged with a screw groove, which is formed on an outer peripheral surface of the steered shaft, via a plurality of balls. The ball screw nut is rotatably held by the rack housing. The ball screw nut is connected to a driving source such as an electric motor via a driving force transmission mechanism. The ball screw nut is rotationally driven by the driving source so as to rotate with respect to the rack housing, thereby moving the steered shaft in the axial direction. The bearing is a ball bearing disposed between an inner peripheral surface of the rack housing and an outer peripheral surface of the ball screw nut. The bearing is interposed between the rack housing and the ball screw nut and supports the ball screw nut such that the ball screw nut is rotatable with respect to the rack housing.

In the steering apparatus described above, when an output shaft of the driving source is rotated, its rotation torque is transmitted to the ball screw nut via the driving force transmission mechanism, and thus, the ball screw nut is rotated. When the ball screw nut is rotated, a force for moving the steered shaft in the axial direction is applied to the steered shaft, and thus, the steered shaft is moved in the axial direction. Therefore, it is possible to assist steering operation of a vehicle driver, by using, as an assist force, the axial force applied to the steered shaft from the driving source via the driving force transmission mechanism.

An axial end portion of the steered shaft is covered by a tubular rack boot formed in a bellows shape. The rack boot protects steering components such as a ball joint and a tie rod connected to the axial end portion of the steered shaft such that foreign matter and so on do not enter the steering components. Since the rack boot is generally a component made of a resin having elasticity, the rack boot may be damaged and broken due to a flying stone or the like from the road surface.

The rack housing includes, at its axial end portion, a stopper portion protruding radially inward from a cylindrical inner peripheral surface of the rack housing. The stopper portion separates a ball screw chamber housing the ball screw nut and an inner chamber of the rack boot. The stopper portion is provided with a through-hole through which the steered shaft extends. Therefore, when the rack boot is broken as described above, water may enter the inner chamber of the rack boot from its broken portion and then the water may enter the rack housing (specifically, the ball screw chamber) via the through-hole of the stopper portion. Since the through-hole of the stopper portion is opened at substantially the axis center of the stopper portion, the water having entered the ball screw chamber can stay until the water level in the ball screw chamber reaches the through-hole. Water is frozen in a low temperature environment. As the water level in the ball screw chamber becomes higher, the freezing amount may be increased so that a resistance force for impeding the rotation of the ball screw nut may be increased. As a result, there is a possibility that an assist force applied to the steered shaft from the driving source becomes insufficient.

In view of this, the steering apparatus described in JP 2014-189060 A includes an opening hole provided in a lower surface of the rack housing and providing communication between the ball screw chamber and the outside, and a drain valve provided so as to close the opening hole. The drain valve is opened by the pressure of water when the amount of water staying in the ball screw chamber of the rack housing has reached a predetermined amount. Therefore, in this steering apparatus, the water having entered the ball screw chamber can be drained to the outside of the rack housing from the opening hole via the drain valve.

SUMMARY

However, in the structure in which the drainage of water from the ball screw chamber is carried out through the opening hole provided in the lower surface of the rack housing via the drain valve, since the water is allowed to stay in the ball screw chamber until the water amount in the ball screw chamber reaches the predetermined amount, when the water is frozen in the low temperature environment, the freezing of the water is likely to impede the rotation of the ball screw nut. If the drain valve is set such that the water pressure in the ball screw chamber for starting the drainage is low, there is a high possibility that water enters the ball screw chamber from the outside via the drain valve. Further, if the water in the ball screw chamber is frozen, there is a high possibility that opening of the drain valve disposed on the lower surface of the rack housing is impeded due to the freezing of the water, and therefore, the drainability of water from the ball screw chamber may deteriorate.

The disclosure provides a steering apparatus in which drainability of water from a ball screw chamber of a rack housing is ensured.

A steering apparatus according to an aspect of the disclosure includes a steered shaft having an outer peripheral surface on which a screw groove is provided; a rack housing having a cylindrical shape and holding the steered shaft such that the steered shaft is movable in an axial direction of the steered shaft; a ball screw nut threadedly engaged with the screw groove via a plurality of balls and configured to be rotationally driven by a driving source so as to move the steered shaft in the axial direction; a bearing disposed between an inner peripheral surface of the rack housing and an outer peripheral surface of the ball screw nut, the bearing supporting the ball screw nut such that the ball screw nut is rotatable with respect to the rack housing; and a rack boot having a tubular shape and covering an axial end portion of the rack housing. The rack housing includes a partition wall protruding radially inward from a cylindrical inner peripheral surface of the rack housing and separating a ball screw chamber housing the ball screw nut and an inner chamber of the rack boot. The partition wall has a through-hole through which the steered shaft extends, and a drain passage provided vertically below the through-hole, the drain passage providing communication between the ball screw chamber and the inner chamber of the rack boot.

With this configuration, since the drain passage is provided vertically below the through-hole in the stopper portion of the rack housing, water having entered the ball screw chamber can be drained to the outside of the ball screw chamber via the drain passage before the water level in the ball screw chamber reaches the through-hole. Therefore, it is possible to reduce the maximum amount of water staying in the ball screw chamber and thus to lower the water level in the ball screw chamber. Consequently, the drainability of water from the ball screw chamber of the rack housing can be appropriately ensured.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The configuration of a steering apparatus 10 according to a first embodiment will be described with reference to FIGS. 1 to 4. The steering apparatus 10 is an apparatus that moves a steered shaft in an axial direction A of the steered shaft to turn steered wheels respectively connected to both ends of the steered shaft.

Figure 1:
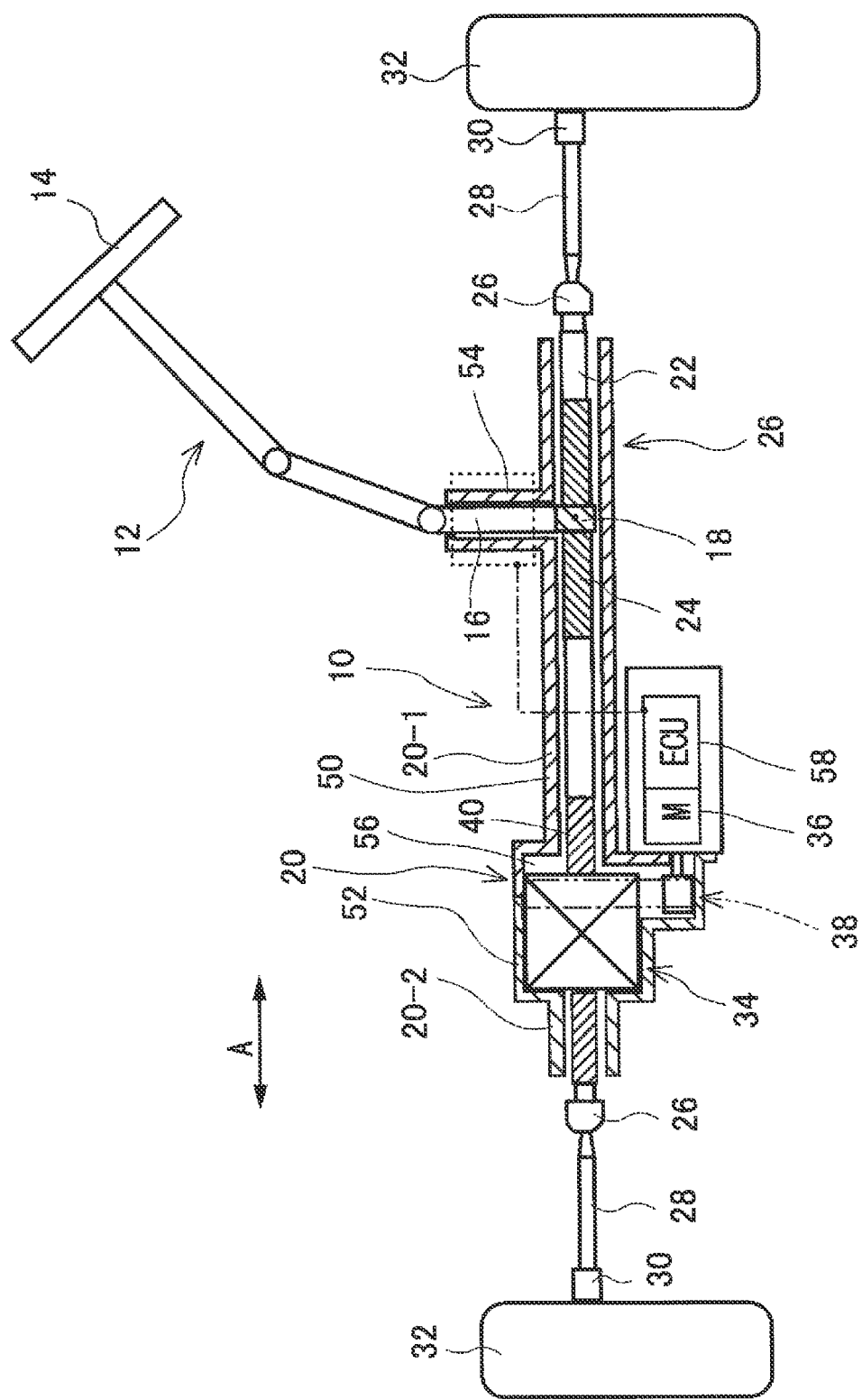
FIG. 1 is a configuration diagram of a steering apparatus according to a first embodiment of the disclosure.

As shown in FIG. 1, the steering apparatus 10 includes a steering mechanism 12. The steering mechanism 12 includes a steering wheel 14 and a steering shaft 16. The steering wheel 14 is disposed in a vehicle cabin so as to be operable by a vehicle driver and is rotatably supported. The steering wheel 14 is rotated by rotating operation performed by the vehicle driver. One end portion of the steering shaft 16 is connected to the steering wheel 14. The steering shaft 16 is rotatably held by a rack housing 20 fixed to a vehicle body. The steering shaft 16 rotates in accordance with the rotation of the steering wheel 14. A pinion 18 constituting a part of a rack and pinion mechanism is provided at the other end portion of the steering shaft 16.

Figure 2:
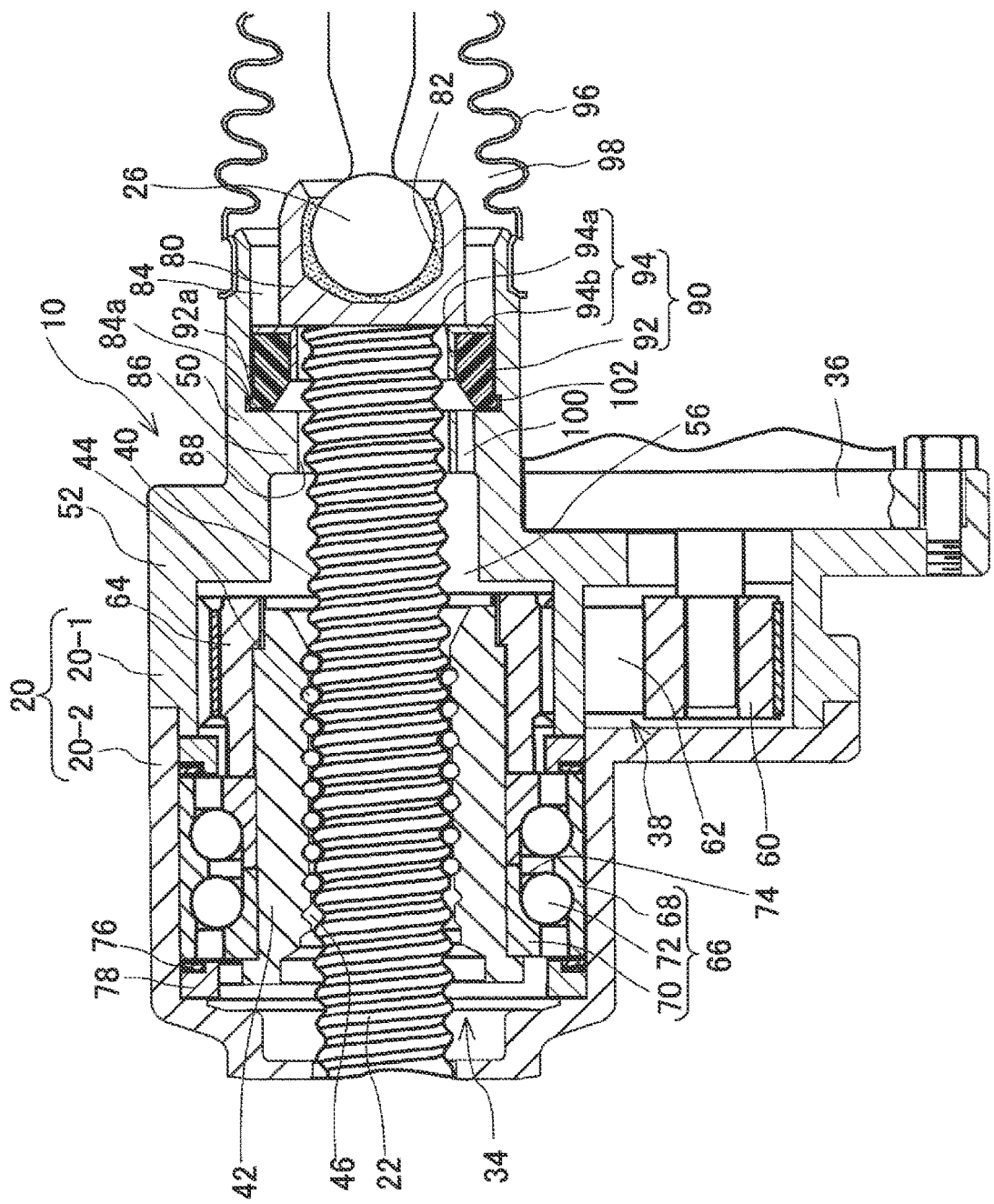
FIG. 2 is a sectional view of a main part of the steering apparatus of the first embodiment.

As shown in FIGS. 1 and 2, the steering apparatus 10 includes a steered shaft (rack shaft) 22. The steered shaft 22 is a shaft member extending in a vehicle width direction. The steered shaft 22 is provided with a rack 24. The rack 24 is provided at a position offset to either one end of the steered shaft 22. The rack 24 constitutes the rack and pinion mechanism together with the pinion 18. The pinion 18 of the steering shaft 16 and the rack 24 of the steered shaft 22 are meshed with each other.

The steering shaft 16 transmits torque, which is applied to the steering wheel 14 by rotating operation performed by the vehicle driver, to the steered shaft 22. The steered shaft 22 moves in the vehicle width direction, i.e., in the axial direction A, along with the rotation of the steering shaft 16. The rotation of the steering shaft 16 is converted into a linear movement of the steered shaft 22 in the axial direction A by the rack and pinion mechanism.

Tie rods 28 are pivotally connected to both axial end portions of the steered shaft 22 via ball joints 26, respectively. Steered wheels 32 are respectively connected to the tie rods 28 via knuckle arms 30. The steered wheels 32 are turned by the movement of the steered shaft 22 in the axial direction A. The vehicle is steered to the right side and to the left side by the turning of the steered wheels 32.

The steering apparatus 10 includes a ball screw mechanism 34, an electric motor 36, and a driving force transmission mechanism 38. Using the electric motor 36 as a driving source, the steering apparatus 10 can assist steering torque when the vehicle driver rotationally operates the steering wheel 14. That is, in the steering apparatus 10, rotation torque, which is generated by the electric motor 36, is transmitted to the ball screw mechanism 34 via the driving force transmission mechanism 38 and the rotation torque is converted into a force for moving the steered shaft 22 linearly in the axial direction A by the ball screw mechanism 34. Thus, the steering apparatus 10 applies an assist force to the steered shaft 22 to assist the turning of the steered wheels 32. The steering apparatus 10 is a so-called rack-parallel steering apparatus.

The ball screw mechanism 34 includes a ball screw portion 40 and a ball screw nut 42. The ball screw portion 40 is an outer peripheral groove as a screw groove that is formed on an outer peripheral surface of the steered shaft 22 such that a plurality of helical turns is formed. The ball screw portion 40 is provided at a position offset to the other end of the steered shaft 22 (specifically, a position that is different from the position of the rack 24 and that is the other end portion on the side opposite to the one end portion where the rack 24 is provided). As shown in FIG. 2, the ball screw nut 42 is a cylindrical member formed in a cylindrical shape and extending in the axial direction A. The ball screw nut 42 is disposed coaxially with the steered shaft 22. The ball screw nut 42 has an outside diameter greater than that of the steered shaft 22. The ball screw nut 42 has an inner peripheral groove as a screw groove that is formed on an inner peripheral surface of the ball screw nut 42 such that a plurality of helical turns is formed.

The outer peripheral groove of the ball screw portion 40 and the inner peripheral groove of the ball screw nut 42 are disposed to face each other in a radial direction. A rolling path 46, along which a plurality of rolling balls 44 rolls, is formed between the outer peripheral groove of the ball screw portion 40 and the inner peripheral groove of the ball screw nut 42. The rolling balls 44 are rollably arranged in the rolling path 46. The outer peripheral groove of the ball screw portion 40 and the inner peripheral groove of the ball screw nut 42 are threadedly engaged with each other via the rolling balls 44. The rolling balls 44 are endlessly circulated by a deflector (not shown) provided in the ball screw nut 42.

The steered shaft 22 is inserted through the rack housing 20 so as to be movable in the axial direction A and is held by the rack housing 20. The rack housing 20 covers the steered shaft 22 while holding the steered shaft 22 to be movable in the axial direction A. The rack housing 20 is a member formed in a substantially tubular shape and extending in the axial direction A. The rack housing 20 has a small-diameter portion 50 and a large-diameter portion 52.

The small-diameter portion 50 has an inside diameter slightly greater than the outside diameter of the steered shaft 22. A steering shaft insertion portion 54 through which the steering shaft 16 is inserted is connected to the small-diameter portion 50. The large-diameter portion 52 has an inside diameter greater than that of the small-diameter portion 50. The ball screw mechanism 34 and the driving force transmission mechanism 38 are housed in the large-diameter portion 52. A ball screw chamber 56 is formed in the large-diameter portion 52. In the ball screw chamber 56, mainly the ball screw nut 42 and the rolling balls 44 are disposed. The ball screw nut 42 is covered by the large-diameter portion 52 so as to be rotatable.

The rack housing 20 includes a first rack housing 20-1 and a second rack housing 20-2 that are attachable to and detachable from each other in the axial direction A of the steered shaft 22. An attachable/detachable portion of the rack housing 20 is the large-diameter portion 52. That is, in the rack housing 20, the first rack housing 20-1 and the second rack housing 20-2 are attachable to and detachable from each other in the axial direction A in the large-diameter portion 52. This configuration makes it possible to house the ball screw nut 42 of the ball screw mechanism 34 and the driving force transmission mechanism 38 in the large-diameter portion 52. The first rack housing 20-1 includes the steering shaft insertion portion 54 and a part of the large-diameter portion 52. The second rack housing 20-2 includes the remaining part of the large-diameter portion 52.

The first rack housing 20-1 and the second rack housing 20-2 of the rack housing 20 are fitted to each other. Specifically, this fitting is achieved by connecting a large-diameter portion of the first rack housing 20-1 and a large-diameter portion of the second rack housing 20-2 to each other in a spigot-joint manner. This fitting is carried out after the ball screw nut 42 of the ball screw mechanism 34 and the driving force transmission mechanism 38 are housed in the large-diameter portion 52.

The steering apparatus 10 includes an ECU 58 that controls the output of the electric motor 36. The electric motor 36 and the ECU 58 are housed adjacent to each other in a case that is fixed in the vicinity of the large-diameter portion 52 of the rack housing 20. The electric motor 36 is disposed such that its output shaft is parallel to the axial direction A of the steered shaft 22. The ECU 58 detects torque applied to the steering wheel 14, using a torque sensor or the like. Based on the detected torque, the ECU 58 sets assist torque to be generated by the electric motor 36, thereby controlling the output of the electric motor 36. The electric motor 36 generates the assist torque in accordance with a command from the ECU 58 and transmits the assist torque to the driving force transmission mechanism 38.

The driving force transmission mechanism 38 has a structure in which its input side is connected to the output shaft of the electric motor 36 and its output side is connected to the outer peripheral side of the ball screw nut 42. Specifically, the driving force transmission mechanism 38 includes a drive pulley 60, a belt 62, and a driven pulley 64. Each of the drive pulley 60 and the driven pulley 64 is a toothed pulley having outer teeth. The belt 62 is a toothed belt having inner teeth and is an annular rubber member.

The drive pulley 60 has a through-hole through which the output shaft of the electric motor 36 is inserted, and the drive pulley 60 is fixedly attached to the output shaft of the electric motor 36. The driven pulley 64 has a through-hole through which the ball screw nut 42 of the ball screw mechanism 34 is inserted, and the driven pulley 64 is fixedly attached to one end of the ball screw nut 42 in the axial direction A. The belt 62 is wound around the drive pulley 60 and the driven pulley 64 and meshed with the outer teeth of the drive pulley 60 and with the outer teeth of the driven pulley 64.

The driving force transmission mechanism 38 is a driving force transmission mechanism that decelerates the rotation of the output shaft of the electric motor 36 with the use of the drive pulley 60, the belt 62, and the driven pulley 64 to transmit the decelerated rotation to the ball screw nut 42. That is, in the driving force transmission mechanism 38, rotation torque, which is generated by the electric motor 36, is transmitted between the drive pulley 60 and the driven pulley 64 via the belt 62. The belt 62 transmits the rotation of the drive pulley 60 to the driven pulley 64 without slip. When the assist torque is transmitted from the electric motor 36 to the driving force transmission mechanism 38, the ball screw nut 42 integrated with the driven pulley 64 is rotationally driven so that the steered shaft 22 is moved in the axial direction A via the rolling balls 44.

The steering apparatus 10 includes a bearing 66. The bearing 66 is disposed between the large-diameter portion 52 of the rack housing 20 and the ball screw nut 42 of the ball screw mechanism 34, i.e., between an inner peripheral surface of the large-diameter portion 52 and an outer peripheral surface of the ball screw nut 42. The bearing 66 is formed in an annular shape. The bearing 66 is provided on the other end portion of the ball screw nut 42 in the axial direction A. The bearing 66 supports the ball screw nut 42 such that the ball screw nut 42 is rotatable with respect to the large-diameter portion 52 of the rack housing 20. The bearing 66 is, for example, a ball bearing such as a double row angular contact ball bearing.

The bearing 66 includes an outer ring portion 68, an inner ring portion 70, and balls 72. The outer ring portion 68 and the inner ring portion 70 are each formed in an annular shape. An outer peripheral surface of the outer ring portion 68 faces the inner peripheral surface of the large-diameter portion 52 of the rack housing 20 in the radial direction. An inner peripheral surface of the inner ring portion 70 faces the outer peripheral surface of the ball screw nut 42 in the radial direction and is fixedly attached to the ball screw nut 42. The inner ring portion 70 rotates in accordance with the ball screw nut 42, that is, the inner ring portion 70 rotates together with the ball screw nut 42. Annular grooves are respectively formed on an inner peripheral surface of the outer ring portion 68 and an outer peripheral surface of the inner ring portion 70. The groove of the outer ring portion 68 and the groove of the inner ring portion 70 are disposed to face each other in the radial direction. An annular rolling path 74 is formed between the groove of the outer ring portion 68 and the groove of the inner ring portion 70. The balls 72 are rollably arranged in the rolling path 74 along its circumferential direction, and the balls 72 roll along with the rotation of the inner ring portion 70, i.e., the ball screw nut 42, while being supported by the outer ring portion 68.

In the structure of the steering apparatus 10 described above, when the steering wheel 14 is operated, its steering torque is transmitted to the steering shaft 16, and thus, the steered shaft 22 is moved in the axial direction A via the rack and pinion mechanism constituted by the pinion 18 and the rack 24. The steering torque transmitted to the steering shaft 16 is detected by the ECU 58 with the use of the torque sensor or the like. The ECU 58 performs output control for the electric motor 36 based on the steering torque, the rotational position of the electric motor 36, and so on. The electric motor 36 generates assist torque in accordance with a command from the ECU 58. This assist torque is converted into a driving force for moving the steered shaft 22 in the axial direction A via the driving force transmission mechanism 38 and the ball screw mechanism 34.

When the steered shaft 22 is moved in the axial direction A, the directions of the steered wheels 32 are changed via the ball joints 26, the tie rods 28, and the knuckle arms 30. Therefore, in the steering apparatus 10, since the assist torque generated by the electric motor 36 in accordance with the steering torque applied to the steering shaft 16 can be applied to the axial movement of the steered shaft 22, it is possible to reduce the steering force when the vehicle driver operates the steering wheel 14.

In the steering apparatus 10, an elastic member 76 and a plate member 78 holding the elastic member 76 are disposed between the first rack housing 20-1 of the rack housing 20 and the outer ring portion 68 of the bearing 66. Another elastic member 76 and another plate member 78 are disposed between the second rack housing 20-2 of the rack housing 20 and the outer ring portion 68 of the bearing 66. Each elastic member 76 is an annular elastic member having elasticity and is, for example, a disc spring made of metal. Each plate member 78 is made of metal such as iron. The plate member 78 has an L-shape in section and has an annular shape.

While holding the elastic member 76, the plate member 78 is disposed on the outer peripheral side of the ball screw nut 42 so as to be sandwiched between the outer ring portion 68 of the bearing 66 and the rack housing 20 in the axial direction A. The elastic member 76 is disposed so as to be sandwiched between the outer ring portion 68 and the plate member 78 in the axial direction A. The elastic member 76 presses, at its inner peripheral end portion, a flange portion of the plate member 78 in the axial direction A, and presses, at its outer peripheral end portion, the outer ring portion 68 in the axial direction A. The outer ring portion 68 is sandwiched between the two elastic members 76 in the axial direction A, and is held between the two elastic members 76 by their elastic forces. The outer ring portion 68 of the bearing 66 is held by the two elastic members 76 so as to be elastically displaceable in the axial direction A with respect to the rack housing 20.

Immediately after the start of operation of the steering wheel 14 from its neutral state, the movement in the axial direction A of the steered shaft 22 does not cause rotation of the ball screw nut 42, and therefore, the ball screw nut 42 slightly moves in the axial direction A together with the bearing 66, and then the displacement of the bearing 66 is restrained while one of the two elastic members 76 is compressed. Thereafter, since the ball screw nut 42 is rotated by the operation of the electric motor 36, the movement of the steered shaft 22 in the axial direction A is assisted. Accordingly, since the bearing 66 can be held by the elastic forces of the two elastic members 76 so as to be displaceable in the axial direction A, the rotation of the ball screw nut 42 and thus the movement of the steered shaft 22 in the axial direction A can be carried out smoothly.

In the steering apparatus 10, large-diameter members 80 are attached to the steered shaft 22. The large-diameter members 80 are respectively provided at both axial end portions of the steered shaft 22 and are coaxially connected to the steered shaft 22. The large-diameter member 80 has an outside diameter greater than that of the steered shaft 22. The large-diameter member 80 is provided with a substantially spherical opening hole 82 that is open axially outward. A ball end of a ball stud constituting the ball joint 26 is rotatably received in the opening hole 82 via a buffer member.

Large-diameter receiving chambers 84 that respectively receive the large-diameter members 80 are respectively formed at both axial end portions of the rack housing 20 (specifically, at axially outer end portions of the small-diameter portions 50 at both axial ends of the rack housing 20). The large-diameter receiving chamber 84 has a diameter greater than the outside diameter of the large-diameter member 80. The rack housing 20 has stopper portions 86. The stopper portion 86 is provided closer to the axially center of the steered shaft 22 than the large-diameter member 80 is. The stopper portion 86 extends radially inward from a cylindrical inner peripheral surface of the body of the rack housing 20 (specifically, the small-diameter portion 50), and the stopper portion 86 is formed in an annular shape. The stopper portion 86 is a wall member for forming the ball screw chamber 56 and the large-diameter receiving chamber 84 and is a partition plate that separates the ball screw chamber 56 and the large-diameter receiving chamber 84.

A through-hole 88 through which the steered shaft 22 extends is formed at the axis center of the stopper portion 86. The through-hole 88 is formed in a circular shape corresponding to the external shape of the steered shaft 22 and has a diameter greater than the outside diameter of the steered shaft 22. The stopper portion 86 has a function of restraining the steered shaft 22, to which the large-diameter member 80 is attached, from moving in the axial direction A by more than a predetermined stroke. The stopper portion 86 has an axial thickness that is necessary for withstanding a pressing force from the large-diameter member 80 so as to restrain the steered shaft 22 from moving by more than the predetermined stroke.

The steering apparatus 10 includes end dampers 90. The end damper 90 is a device configured to absorb an impact that occurs when an axial end face of the large-diameter member 80 abuts against the stopper portion 86 of the rack housing 20 due to the axial movement of the steered shaft 22, thereby preventing tooth jumping of the belt 62 of the driving force transmission mechanism 38 or the like. The end damper 90 is provided adjacent to and axially outward of the stopper portion 86 and is disposed between the large-diameter member 80 and the stopper portion 86. The end damper 90 includes an elastic body 92 such as a resin or a spring and a holding plate 94 which holds the elastic body 92 and with which the axial end face of the large-diameter member 80 comes in contact. Using the elastic body 92, the end damper 90 dampens (reduces) an impact force that occurs when the steered shaft 22 abuts against the end damper 90.

The holding plate 94 is a member having a substantially cylindrical shape and having an L-shape in section. The holding plate 94 is made of metal such as iron. The holding plate 94 includes a cylindrical portion 94a extending in the axial direction A and a flange portion 94b extending radially outward from one axial end of the cylindrical portion 94a. The cylindrical portion 94a has an inner peripheral surface that faces the outer peripheral surface of the steered shaft 22. A through-hole is provided at an axis center of the cylindrical portion 94a. The steered shaft 22 extends through the through-hole. The flange portion 94b is provided at an axial end portion on the far side from the stopper portion 86, in the cylindrical portion 94a. The axial end face of the large-diameter member 80 comes in contact with the flange portion 94b. The flange portion 94b and the large-diameter member 80 are spaced apart from each other before the movement amount of the steered shaft 22 in the axial direction A reaches the predetermined stroke, while they come in contact with each other when the movement amount has reached the predetermined stroke. FIG. 2 shows a state in which the axial end face of the large-diameter member 80 is in contact with the flange portion 94b of the holding plate 94 of the end damper 90.

The elastic body 92 is bonded to the cylindrical portion 94a and the flange portion 94b of the holding plate 94 so as to be integrated with the holding plate 94. The elastic body 92 is configured such that its protruding portion 92a is fitted into a groove portion 84a formed in the large-diameter receiving chamber 84 of the rack housing 20 in the state where the elastic body 92 is integrated with the holding plate 94. The end damper 90 is positioned with respect to the rack housing 20 by fitting the elastic body 92 into the groove portion 84a of the rack housing 20. The elastic body 92 is formed to have a size and shape necessary for absorbing an impact that occurs when the large-diameter member 80 abuts against the stopper portion 86, and is formed to have a size and shape necessary for fitting into the groove portion 84a of the large-diameter receiving chamber 84.

Upon receipt of an impact force when the axial end face of the large-diameter member 80 comes in contact with the flange portion 94b and presses it in the axial direction A, the holding plate 94 transmits the impact to the elastic body 92. By the impact applied from the holding plate 94, the elastic body 92 is displaced in the axial direction A together with the holding plate 94 to approach the stopper portion 86 of the rack housing 20. When the movement amount of the steered shaft 22 in the axial direction A has reached the predetermined stroke, the elastic body 92 is sandwiched between the holding plate 94 and the stopper portion 86 so as to be compressively deformed. Consequently, the impact force applied from the large-diameter member 80 to the holding plate 94 of the end damper 90 is absorbed by the effect of the elastic deformation of the elastic body 92.

In the steering apparatus 10, both axial end portions of the rack housing 20 are respectively covered by rack boots 96. The rack boot 96 is tubular, and extends in the axial direction A of the steered shaft 22. The rack boot 96 is formed in a bellows shape. The rack boot 96 is made of a resin material having elasticity. The rack boot 96 has one axial end fixedly attached to an outer peripheral surface of the axial end portion of the small-diameter portion 50 of the rack housing 20, and the other axial end fixedly attached to the tie rod 28. The rack boot 96 encloses the ball joint 26 and the tie rod 28 connected to the axial end portion of the steered shaft 22, thereby preventing foreign matter such as a flying stone from entering, from outside, an inner chamber 98 in which the ball joint 26 and the tie rod 28 are housed.

Figure 3:
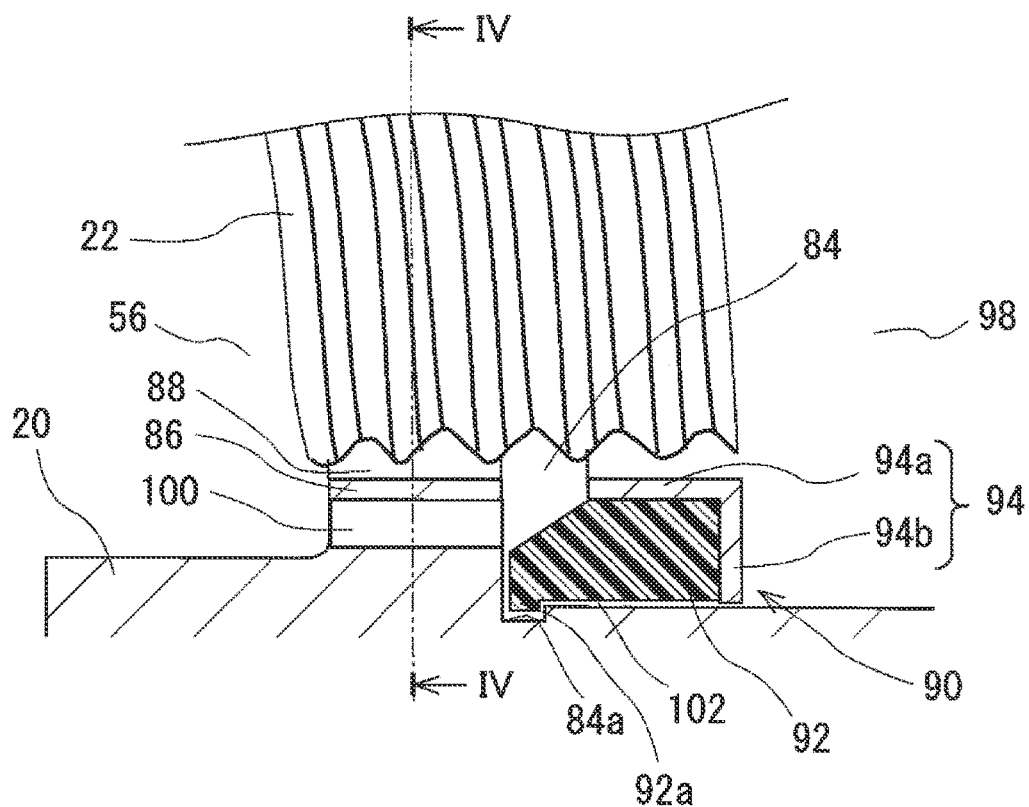
FIG. 3 is an enlarged sectional view of a main part of the steering apparatus of the first embodiment.
Figure 4:
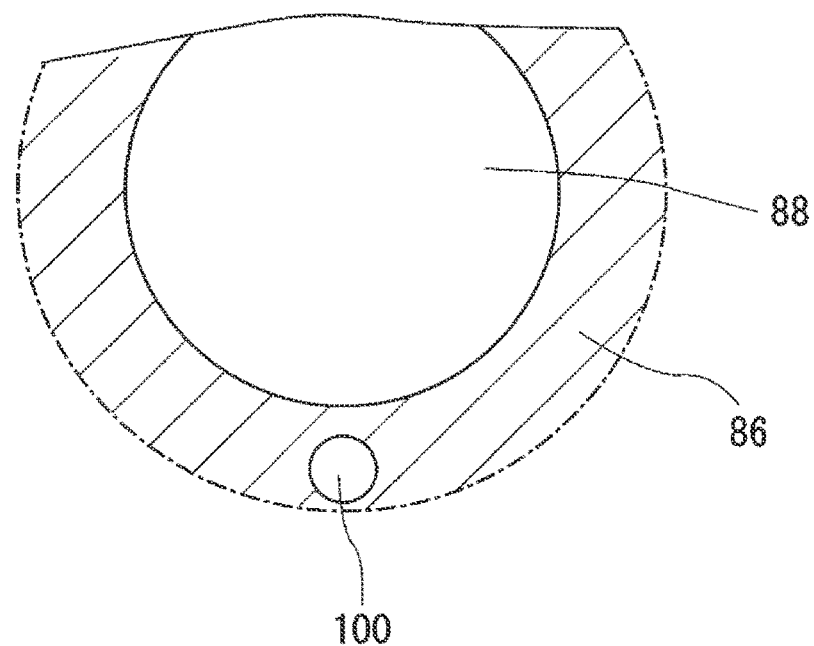
FIG. 4 is a IV-IV sectional view of the steering apparatus shown in FIG. 3.

As described above, the rack housing 20 includes the stopper portion 86 extending radially inward from its cylindrical inner peripheral surface. The stopper portion 86 is the partition wall that separates the ball screw chamber 56 and the large-diameter receiving chamber 84 and thus the inner chamber 98 of the rack boot 96. As shown in FIGS. 2, 3, and 4, the stopper portion 86 has, as described above, the through-hole 88 which is formed at its axis center and through which the steered shaft 22 extends, and further has a drain passage 100 which is different from the through-hole 88.

The drain passage 100 is a hole provided in the stopper portion 86 separately from the through-hole 88 and is provided for draining water staying in the ball screw chamber 56 to the outside. In the state where the steering apparatus 10 is attached to the vehicle, the drain passage 100 is disposed vertically below the through-hole 88 in the stopper portion 86 and extends through the stopper portion 86 in the axial direction A. The drain passage 100 is a communication passage providing communication between the ball screw chamber 56 and the large-diameter receiving chamber 84, and thus between the ball screw chamber 56 and the inner chamber 98 of the rack boot 96. As shown in FIG. 4, the cross-sectional shape of the drain passage 100 is circular. The drain passage 100 is formed such that its diameter is smaller than a radial width of the stopper portion 86.

The cross-sectional shape of the drain passage 100 may be quadrangular, elliptical, hexagonal, or the like. The drain passage 100 may be any drain passage as long as the drain passage 100 includes at least a passage portion located below a lower end position of the through-hole 88. Therefore, the drain passage 100 may include a passage portion located above the lower end position of the through-hole 88. The single drain passage 100 may be provided in the stopper portion 86. Alternatively, two or more different drain passages 100 may be provided. As will be described later, in order to improve the drainability from the ball screw chamber 56 to the inner chamber 98 of the rack boot 96, in the state where the steering apparatus 10 is attached to the vehicle, the drain passage 100 may be disposed directly under the through-hole 88, i.e., vertically below with respect to the axis center of the through-hole 88, and the position at which a lower end of the drain passage 100 communicates with the ball screw chamber 56 may be close to a lower end of the ball screw chamber 56 (specifically, a root portion where the stopper portion 86 is connected to the cylindrical inner peripheral surface of the rack housing 20).

As described above, the end damper 90 is provided adjacent to and axially outward of the stopper portion 86 and is disposed between the large-diameter member 80 and the stopper portion 86. The end damper 90 is a non-seal member for the rack housing 20. That is, the dimensions of the elastic body 92 of the end damper 90 are set such that a gap space is formed between the elastic body 92 and the rack housing 20. For example, the elastic body 92 is formed such that an outside diameter of the protruding portion 92a is smaller than an inside diameter of the groove portion 84a of the large-diameter receiving chamber 84 of the rack housing 20. Further, the elastic body 92 is formed such that when the protruding portion 92a is fitted into the groove portion 84a, a gap is formed between the elastic body 92 and the stopper portion 86 and between the elastic body 92 and the inner peripheral surface of the rack housing 20.

The gap space formed between the elastic body 92 of the end damper 90 and the rack housing 20 constitutes a communication passage 102 that allows the drain passage 100 to communicate with the large-diameter receiving chamber 84 and thus the inner chamber 98 of the rack boot 96 via the end damper 90. That is, the communication passage 102 is the gap space formed between the elastic body 92 and the rack housing 20.

In the structure of the steering apparatus 10 described above, when water has entered the inner chamber 98 due to breakage of the rack boot 96 and then the water has entered the large-diameter receiving chamber 84 and further has entered the ball screw chamber 56 via the through-hole 88 of the stopper portion 86 and so on, the water having entered the ball screw chamber 56 can be drained to the outside via the drain passage 100 disposed vertically below the through-hole 88 of the stopper portion 86.

In this structure, since the water having entered the ball screw chamber 56 can be drained to the outside of the ball screw chamber 56 via the drain passage 100 before the water level in the ball screw chamber 56 reaches the through-hole 88, it is possible to reduce the maximum amount of water staying in the ball screw chamber 56 and thus to lower the water level in the ball screw chamber 56 as compared to the structure in which the drain passage 100 is not provided. Therefore, in the steering apparatus 10, the drainability of water from the ball screw chamber 56 of the rack housing 20 can be appropriately ensured.

Therefore, according to this embodiment, when the water in the ball screw chamber 56 is frozen, the maximum freezing amount can be reduced to a small amount. Therefore, it is possible to reduce a resistance force that impedes the rotation of the ball screw nut 42 due to the freezing of water. Consequently, the influence due to the freezing of water in the ball screw chamber 56 can be prevented from being exerted on an assist force that is applied to the steered shaft 22 from the electric motor 36 via the driving force transmission mechanism 38 and the ball screw mechanism 34. Therefore, even when the water in the ball screw chamber 56 is frozen, the vehicle driver can operate the steering wheel 14 without a large increase in torque.

In the structure of the steering apparatus 10 described above, since the communication passage 102 that allows the drain passage 100 to communicate with the large-diameter receiving chamber 84 and thus the inner chamber 98 of the rack boot 96 via the end damper 90 is provided between the end damper 90 and the rack housing 20, water that is drained from the inside of the ball screw chamber 56 to the outside of the ball screw chamber 56 via the drain passage 100 can be returned to the large-diameter receiving chamber 84 and the inner chamber 98 of the rack boot 96 through the communication passage 102. Therefore, it is possible to prevent a situation where the drainage of water from the inside of the ball screw chamber 56 to the outside of the ball screw chamber 56 via the drain passage 100 is impeded by the end damper 90. Accordingly, a portion of or the whole of the water drained to the outside of the ball screw chamber 56 can be drained onto the road surface from a broken portion of the rack boot 96.

As is clear from the foregoing, the steering apparatus 10 of the first embodiment includes the steered shaft 22 having an outer peripheral surface on which the ball screw portion 40 is provided; the rack housing 20 having a cylindrical shape and holding the steered shaft 22 such that the steered shaft 22 is movable in the axial direction A; the ball screw nut 42 threadedly engaged with the ball screw portion 40 via the rolling balls 44 and configured to be rotationally driven by the electric motor 36 so as to move the steered shaft 22 in the axial direction A; the bearing 66 disposed between the inner peripheral surface of the rack housing 20 and the outer peripheral surface of the ball screw nut 42, the bearing 66 supporting the ball screw nut 42 such that the ball screw nut 42 is rotatable with respect to the rack housing 20; and the rack boot 96 having a tubular shape and covering the axial end portion of the rack housing 20. The rack housing 20 includes the stopper portion 86 protruding radially inward from a cylindrical inner peripheral surface of the rack housing 20 and separating the ball screw chamber 56 housing the ball screw nut 42 and the inner chamber 98 of the rack boot 96. The stopper portion 86 has the through-hole 88 through which the steered shaft 22 extends, and the drain passage 100 provided vertically below the through-hole 88, the drain passage 100 providing communication between the ball screw chamber 56 and the inner chamber 98 of the rack boot 96. The drain passage 100 is the hole provided in the stopper portion 86 separately from the through-hole 88. The stopper portion 86 is a stopper portion that is provided in the rack housing 20 and restrains the steered shaft 22 from moving by more than the predetermined stroke.

With this configuration, since the drain passage 100 is provided vertically below the through-hole 88 in the stopper portion 86 of the rack housing 20, water having entered the ball screw chamber 56 can be drained to the outside of the ball screw chamber 56 via the drain passage 100 before the water level in the ball screw chamber 56 reaches the through-hole 88. Therefore, it is possible to reduce the maximum amount of water staying in the ball screw chamber 56 and thus to lower the water level in the ball screw chamber 56. Consequently, the drainability of water from the ball screw chamber 56 of the rack housing 20 can be appropriately ensured.

The steering apparatus 10 includes the end damper 90 provided adjacent to the stopper portion 86 in the axial direction, and configured to dampen the movement of the steered shaft 22, and the communication passage 102 allowing the drain passage 100 to communicate with the inner chamber 98 of the rack boot 96 via the end damper 90. The end damper 90 is the non-seal member for the rack housing 20, and the communication passage 102 is the gap space formed between the end damper 90 and the rack housing 20.

With this configuration, since the communication passage 102 that allows the drain passage 100 to communicate with the inner chamber 98 of the rack boot 96 via the end damper 90 is provided, water that is drained from the inside of the ball screw chamber 56 to the outside of the ball screw chamber 56 via the drain passage 100 can be returned to the inner chamber 98 of the rack boot 96 through the communication passage 102. Therefore, it is possible to prevent the situation where the drainage of water from the inside of the ball screw chamber 56 to the outside of the ball screw chamber 56 via the drain passage 100 is impeded by the end damper 90.

Figure 5:
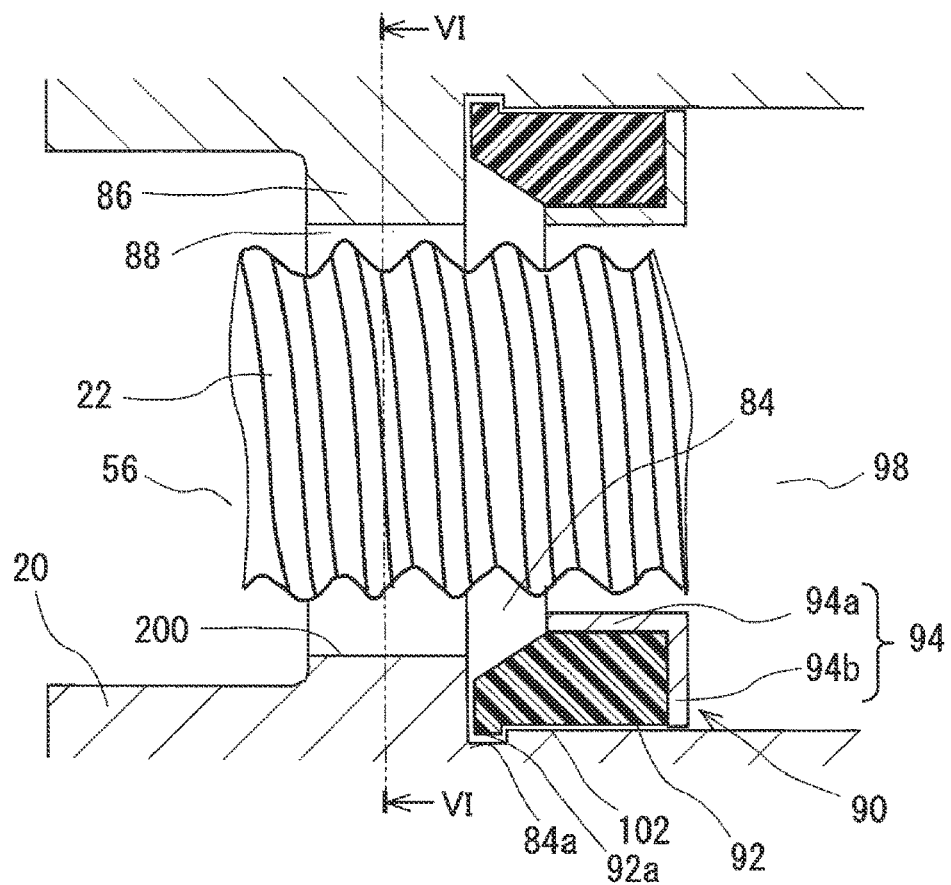
FIG. 5 is an enlarged sectional view of a main part of a steering apparatus according to a second embodiment of the disclosure.
Figure 6:
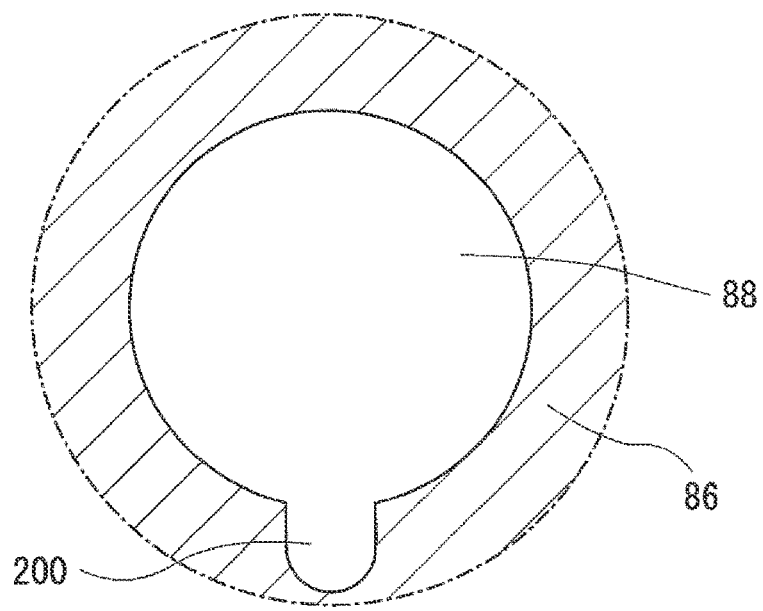
FIG. 6 is a VI-VI sectional view of the steering apparatus shown in FIG. 5.

Next, the configuration of a steering apparatus 10 according to a second embodiment will be described with reference to FIGS. 5 and 6. In FIGS. 5 and 6, the same reference numerals will be assigned to the same components as those shown in FIGS. 3 and 4, and descriptions thereof will be omitted or simplified.

In the steering apparatus 10, as shown in FIGS. 5 and 6, a stopper portion 86 of a rack housing 20 has a through-hole 88 through which a steered shaft 22 extends, and further has a drain passage 200 that is different from the through-hole 88. The drain passage 200 is a groove provided in the stopper portion 86 and communicating with the circular through-hole 88. The drain passage 200 is provided for draining water staying in a ball screw chamber 56 to the outside. The drain passage 200 is recessed radially outward from the through-hole 88. In the state where the steering apparatus 10 is attached to a vehicle, the drain passage 200 is disposed vertically below the through-hole 88 in the stopper portion 86 and extends through the stopper portion 86 in the axial direction. The drain passage 200 is a communication passage providing communication between the ball screw chamber 56 and a large-diameter receiving chamber 84, and thus between the ball screw chamber 56 and an inner chamber 98 of a rack boot 96. The drain passage 200 is formed such that its radial width is equal to or smaller than a radial width of the stopper portion 86.

As long as the drain passage 200 communicates with the through-hole 88, the cross-sectional shape of the drain passage 200 may be any shape such as an angular shape, a circular arc shape, or an elliptical arc shape. The drain passage 200 may be any drain passage as long as the drain passage includes at least a passage portion located below a lower end position of the circular through-hole 88 (actually, a position supposed to be a lower end of the circle of the through-hole 88). Therefore, the drain passage 200 may include a passage portion located above the lower end position of the through-hole 88. The single drain passage 200 may be provided in the stopper portion 86. Alternatively, two or more different drain passages 200 may be provided. In order to improve the drainability of water from the ball screw chamber 56 to the inner chamber 98 of the rack boot 96, in the state where the steering apparatus 10 is attached to the vehicle, the drain passage 200 may be disposed directly under the through-hole 88, i.e., vertically below with respect to the axis center of the through-hole 88, and the position at which a lower end of the drain passage 200 communicates with the ball screw chamber 56 may be close to a lower end of the ball screw chamber 56 (specifically, a root portion where the stopper portion 86 is connected to a cylindrical inner peripheral surface of the rack housing 20).

A gap space formed between an elastic body 92 of an end damper 90 and the rack housing 20 constitutes a communication passage 102 that allows the drain passage 200 to communicate with the large-diameter receiving chamber 84 and thus the inner chamber 98 of the rack boot 96 via the end damper 90. That is, the communication passage 102 is the gap space formed between the elastic body 92 and the rack housing 20.

As is clear from the foregoing, the steering apparatus 10 of the second embodiment includes the steered shaft 22 having an outer peripheral surface on which a ball screw portion 40 is provided; the rack housing 20 having a cylindrical shape and holding the steered shaft 22 such that the steered shaft 22 is movable in the axial direction A; a ball screw nut 42 threadedly engaged with the ball screw portion 40 via a plurality of rolling balls 44 and configured to be rotationally driven by an electric motor 36 so as to move the steered shaft 22 in the axial direction A; a bearing 66 disposed between the inner peripheral surface of the rack housing 20 and an outer peripheral surface of the ball screw nut 42, the bearing 66 supporting the ball screw nut 42 such that the ball screw nut 42 is rotatable with respect to the rack housing 20; and the rack boot 96 having a tubular shape and covering an axial end portion of the rack housing 20. The rack housing 20 includes the stopper portion 86 protruding radially inward from its cylindrical inner peripheral surface and separating the ball screw chamber 56 housing the ball screw nut 42 and the inner chamber 98 of the rack boot 96. The stopper portion 86 has the through-hole 88 through which the steered shaft 22 extends, and the drain passage 200 provided vertically below the through-hole 88 and providing communication between the ball screw chamber 56 and the inner chamber 98 of the rack boot 96. The drain passage 200 is the groove provided in the stopper portion 86 and communicating with the through-hole 88.

With this configuration, since the drain passage 200 is provided vertically below the through-hole 88 in the stopper portion 86 of the rack housing 20, water having entered the ball screw chamber 56 can be drained to the outside of the ball screw chamber 56 via the drain passage 200 before the water level in the ball screw chamber 56 reaches the through-hole 88. Therefore, it is possible to reduce the maximum amount of water staying in the ball screw chamber 56 and thus to lower the water level in the ball screw chamber 56. Consequently, the drainability of water from the ball screw chamber 56 of the rack housing 20 can be appropriately ensured.

The steering apparatus 10 includes the end damper 90 provided axially adjacent to the stopper portion 86 and configured to dampen the movement of the steered shaft 22, and the communication passage 102 allowing the drain passage 200 to communicate with the inner chamber 98 of the rack boot 96 via the end damper 90. The end damper 90 is a non-seal member for the rack housing 20, and the communication passage 102 is the gap space formed between the end damper 90 and the rack housing 20.

With this configuration, since the communication passage 102 that allows the drain passage 200 to communicate with the inner chamber 98 of the rack boot 96 via the end damper 90 is provided, water that is drained from the inside of the ball screw chamber 56 to the outside of the ball screw chamber 56 via the drain passage 200 can be returned to the inner chamber 98 of the rack boot 96 through the communication passage 102. Therefore, it is possible to prevent the situation where the drainage of water from the inside of the ball screw chamber 56 to the outside of the ball screw chamber 56 via the drain passage 200 is impeded by the end damper 90.

In each of the above-described first and second embodiments, the drain passage 100 or 200 is provided in the stopper portion 86 that restrains the steered shaft 22 from moving by more than the predetermined stroke. However, the disclosure is not limited to this configuration. Alternatively, the drain passage 100 or 200 may be provided in a partition wall protruding radially inward from the cylindrical inner peripheral surface of the rack housing 20 and separating the ball screw chamber 56 and the inner chamber 98 of the rack boot 96. Also in this modification, it is possible to obtain the same effects as those of the above-described first and second embodiments.

In each of the above-described first and second embodiments, the end damper 90 is the non-seal member for the rack housing 20, and the communication passage 102 that allows the drain passage 100 or 200 to communicate with the inner chamber 98 of the rack boot 96 via the end damper 90 is the gap space formed between the end damper 90 and the rack housing 20. However, the disclosure is not limited to this configuration. Alternatively, the end damper 90 may be a seal member for the rack housing 20, and the communication passage 102 may be provided so as to extend through a vertically lower portion of the end damper 90 in the axial direction. Also in this modification, it is possible to obtain the same effects as those of the above-described first and second embodiments.

The disclosure is not limited to the above-described embodiments and modifications, and various changes may be made without departing from the scope of the disclosure.

What is claimed is:

1. A steering apparatus comprising:
   a steered shaft having an outer peripheral surface including a screw groove;
   a rack housing having a cylindrical shape and holding the steered shaft such that the steered shaft is movable in an axial direction of the steered shaft;
   a ball screw nut threadedly engaged with the screw groove via a plurality of balls, the ball screw nut being configured to be rotationally driven by a driving source so as to move the steered shaft in the axial direction;

a bearing disposed between an inner peripheral surface of the rack housing and an outer peripheral surface of the ball screw nut, the bearing supporting the ball screw nut such that the ball screw nut is rotatable with respect to the rack housing; and a rack boot having a tubular shape and covering an axial end portion of the rack housing, wherein:

the rack housing includes a partition wall protruding radially inward from a cylindrical inner peripheral surface of the rack housing, the partition wall separating a ball screw chamber housing the ball screw nut and an inner chamber of the rack boot, the partition wall forms a through-hole through which the steered shaft extends by protruding radially inward from the cylindrical inner peripheral surface of the rack housing, and the partition wall includes a drain passage formed through the partition wall in the axial direction, the drain passage being disposed vertically below the through-hole in the partition wall and the steered shaft, the drain passage connecting the ball screw chamber and the inner chamber of the rack boot, and an end damper is located between an axially outer wall of the partition wall and the rack boot, where a first gap is located between the axially outer wall of the partition wall and the end damper and a second gap is located between a radially inner wall of the housing and the end damper.

2. The steering apparatus according to claim 1, wherein the drain passage is a hole provided in the partition wall separately from the through-hole.

3. The steering apparatus according to claim 1, wherein the drain passage is a groove provided in the partition wall and communicating with the through-hole.

4. The steering apparatus according to claim 1, wherein the partition wall is a stopper that is provided in the rack housing, the stopper restraining the steered shaft from moving by more than a predetermined stroke.

5. The steering apparatus according to claim 4, further comprising a communication passage allowing the drain passage to communicate with the inner chamber of the rack boot via the end damper, wherein:

the end damper is provided adjacent to the stopper in the axial direction, the end damper being configured to dampen an impact force that occurs when the steered shaft abuts against the end damper.

6. The steering apparatus according to claim 5, wherein: the end damper is a non-seal member of the rack housing.

* * * * *